(12) United States Patent
Perry

(10) Patent No.: US 11,698,774 B2
(45) Date of Patent: *Jul. 11, 2023

(54) SYSTEMS AND METHODS FOR TRANSLATING DATA READ FROM PROXY APIS INTO COMPUTING CODE

(71) Applicant: Worldpay, LLC, Symmes Township, OH (US)

(72) Inventor: Robert Jacob Perry, Highlands Ranch, CO (US)

(73) Assignee: Worldpay, LLC, Symmes Township, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/735,690

(22) Filed: May 3, 2022

(65) Prior Publication Data

US 2022/0261223 A1  Aug. 18, 2022

Related U.S. Application Data

(63) Continuation of application No. 17/155,703, filed on Jan. 22, 2021, now Pat. No. 11,354,099, which is a continuation of application No. 16/705,401, filed on Dec. 6, 2019, now Pat. No. 10,929,104, which is a continuation of application No. 16/124,883, filed on Sep. 7, 2018, now Pat. No. 10,534,583, which is a continuation of application No. 15/247,437, filed on Aug. 25, 2016, now Pat. No. 10,108,399.

(51) Int. Cl.
*G06F 8/30* (2018.01)
*G06F 8/35* (2018.01)
*G06F 9/54* (2006.01)
*G06Q 20/08* (2012.01)
*G06F 8/36* (2018.01)

(52) U.S. Cl.
CPC .................. *G06F 8/30* (2013.01); *G06F 8/35* (2013.01); *G06F 9/541* (2013.01); *G06Q 20/08* (2013.01); *G06F 8/36* (2013.01)

(58) Field of Classification Search
None
See application file for complete search history.

(56) References Cited

U.S. PATENT DOCUMENTS

| | | |
|---|---|---|
| 2001/0052111 A1 | 12/2001 | Scott |
| 2010/0010906 A1 | 1/2010 | Grecia |
| 2010/0218165 A1 | 8/2010 | Ali |
| 2012/0290527 A1 | 11/2012 | Yalamanchilli |
| 2015/0178708 A1 | 6/2015 | Reutov |

*Primary Examiner* — Qing Chen
(74) *Attorney, Agent, or Firm* — Bookoff McAndrews, PLLC

(57) ABSTRACT

A method for automatically generating sample code for an API for payment processing in a payment network includes reading an acquirer processor-specific API for payment processing in a payment network using an acquirer processor-specific API reader, generating acquirer processor-specific API data using the acquirer processor-specific API reader, converting the acquirer processor-specific API data into a format compatible with an output generator, and generating language-specific sample code by the output generator using the converted acquirer processor-specific API data and a language-specific template.

18 Claims, 6 Drawing Sheets

SYSTEMS AND METHODS FOR TRANSLATING DATA READ FROM PROXY APIS INTO COMPUTING CODE

CROSS-REFERENCE TO RELATED APPLICATION(S)

This patent application is a continuation of and claims the benefit of priority to U.S. application Ser. No. 17/155,703 filed on Jan. 22, 2021, now U.S. Pat. No. 11,354,099, issued on Jun. 7, 2022, which is a continuation of U.S. application Ser. No. 16/705,401, filed on Dec. 6, 2019, now U.S. Pat. No. 10,929,104, issued on Feb. 23, 2021, which is a continuation of and claims the benefit of priority to U.S. application Ser. No. 16/124,883, filed on Sep. 7, 2018, now U.S. Pat. No. 10,534,583, issued on Jan. 14, 2020, which is a continuation of and claims the benefit of priority to U.S. application Ser. No. 15/247,437, filed on Aug. 25, 2016, now U.S. Pat. No. 10,108,399, issued on Oct. 23, 2018, the entireties of which are incorporated herein by reference.

TECHNICAL FIELD

The present disclosure relates generally to the field of providing an application programming interface (API) for payment processing and, more particularly, to automatically generating example computer code for interacting with the provided API.

BACKGROUND

Merchants and other store owners have point of sale (POS) terminals and POS systems that can accept check or payment card payments from consumers for goods and services. Merchants typically contract with an acquirer processor to process payment transactions originating from the merchant's POS terminals and POS systems. Acquirer processors process the payment transactions and settle funds between consumer's and merchant's accounts. Online vendors accept bank and payment card payments from Internet customers and can process those payments using services provided by payment network providers, such as acquirer processors. Utilities, service providers, and other online parties similarly accept bank transfers and accept payments from payment cards using similar services provided by payment network providers.

Interaction between the POS terminals and POS systems and the payment systems provided by the acquirer processor requires software to be installed at the POS terminals and POS systems. Such software interacts with the acquirer processor's payment system according to an application programming interface (API) published by the acquirer processor. Most merchants and store owners lack the expertise and resources to develop such software themselves. Accordingly, in order to obtain the necessary software to allow the POS terminals and POS systems to interact with the systems provided by the acquirer processors, merchants and store owners may turn to independent software vendors (ISVs). An ISV typically creates the necessary software according to the API published by the acquirer processor. The ISV may develop the software in any suitable programming language, such as Java, Ruby, Python, C#, JavaScript, PHP, Perl, etc.

Prior to being deployed in a POS terminal or POS system, the software must be certified with the acquirer processor. For example, a merchant can be required to use only certified POS terminals or POS systems on the acquirer processor's payment processing network. The acquirer processor generally requires the ISV to perform a set of certification tests with a certification system. The certification tests verify that the merchant's payment platforms will be properly configured to send the required transaction data in the correct format to the acquirer processor. Once certified, the acquirer processor grants to the certified payment platforms access to the acquirer processor's payment processing network.

Because such software systems can be complex and the requirements for certification can be stringent, the cost of developing these systems can be high. Accordingly, there is a need for processes and support to reduce the costs of developing these systems and to increase the accuracy of the implementations and their ability to pass certification tests.

SUMMARY

According to certain aspects of the present disclosure, systems and methods are disclosed for automatically generating sample code for an application programming interface (API) for payment processing in a payment network.

In one embodiment, a computer-implemented method is disclosed for automatically generating sample code for an application programming interface (API) for payment processing in a payment network. The method includes: reading an acquirer processor-specific API for payment processing in a payment network using an acquirer processor-specific API reader; generating acquirer processor-specific API data using the acquirer processor-specific API reader; converting the acquirer processor-specific API data into a format compatible with an output generator; and generating language-specific sample code by the output generator using the converted acquirer processor-specific API data and a language-specific template.

In accordance with another embodiment, a system is disclosed for automatically generating sample code for an application programming interface (API) for payment processing in a payment network. The system comprises: a memory having processor-readable instructions stored therein; and a processor configured to access the memory and execute the processor-readable instructions, which when executed by the processor configures the processor to perform a plurality of functions, including functions to: read an acquirer processor-specific API for payment processing in a payment network using an acquirer processor-specific API reader; generate acquirer processor-specific API data using the acquirer processor-specific API reader; convert the acquirer processor-specific API data into a format compatible with an output generator; and generate language-specific sample code by the output generator using the converted acquirer processor-specific API data and a language-specific template In accordance with another embodiment, an alternative system is disclosed for automatically generating sample code for an application programming interface (API) for payment processing in a payment network. The system comprises: a memory; at least one processor; a backend generator configured to: read, using the at least one processor, an acquirer processor-specific API for payment processing in a payment network using an acquirer processor-specific API reader; generate, using the at least one processor, acquirer processor-specific API data using the acquirer processor-specific API reader; convert, using the at least one processor, the acquirer processor-specific API data into a format compatible with an output generator; and an output generator configured to: generate, using the at least one processor, language-specific sample code by the output generator using the converted acquirer processor-specific API data and a language-specific template.

In accordance with another embodiment, a non-transitory machine-readable medium is disclosed that stores instructions that, when executed by a computer, cause the computer to perform a method for automatically generating sample code for an application programming interface (API) for payment processing in a payment network. The method includes: reading an acquirer processor-specific API for payment processing in a payment network using an acquirer processor-specific API reader; generating acquirer processor-specific API data using the acquirer processor-specific API reader; converting the acquirer processor-specific API data into a format compatible with an output generator; and generating language-specific sample code by the output generator using the converted acquirer processor-specific API data and a language-specific template.

Additional objects and advantages of the disclosed embodiments will be set forth in part in the description that follows, and in part will be apparent from the description, or may be learned by practice of the disclosed embodiments. The objects and advantages on the disclosed embodiments will be realized and attained by means of the elements and combinations particularly pointed out in the appended claims.

It is to be understood that both the foregoing general description and the following detailed description are exemplary and explanatory only and are not restrictive of the detailed embodiments, as claimed.

BRIEF DESCRIPTION OF THE DRAWINGS

The accompanying drawings, which are incorporated in and constitute a part of this specification, illustrate exemplary embodiments of the present disclosure and, together with the description, serve to explain the principles of the disclosure.

DETAILED DESCRIPTION

Figure 1:
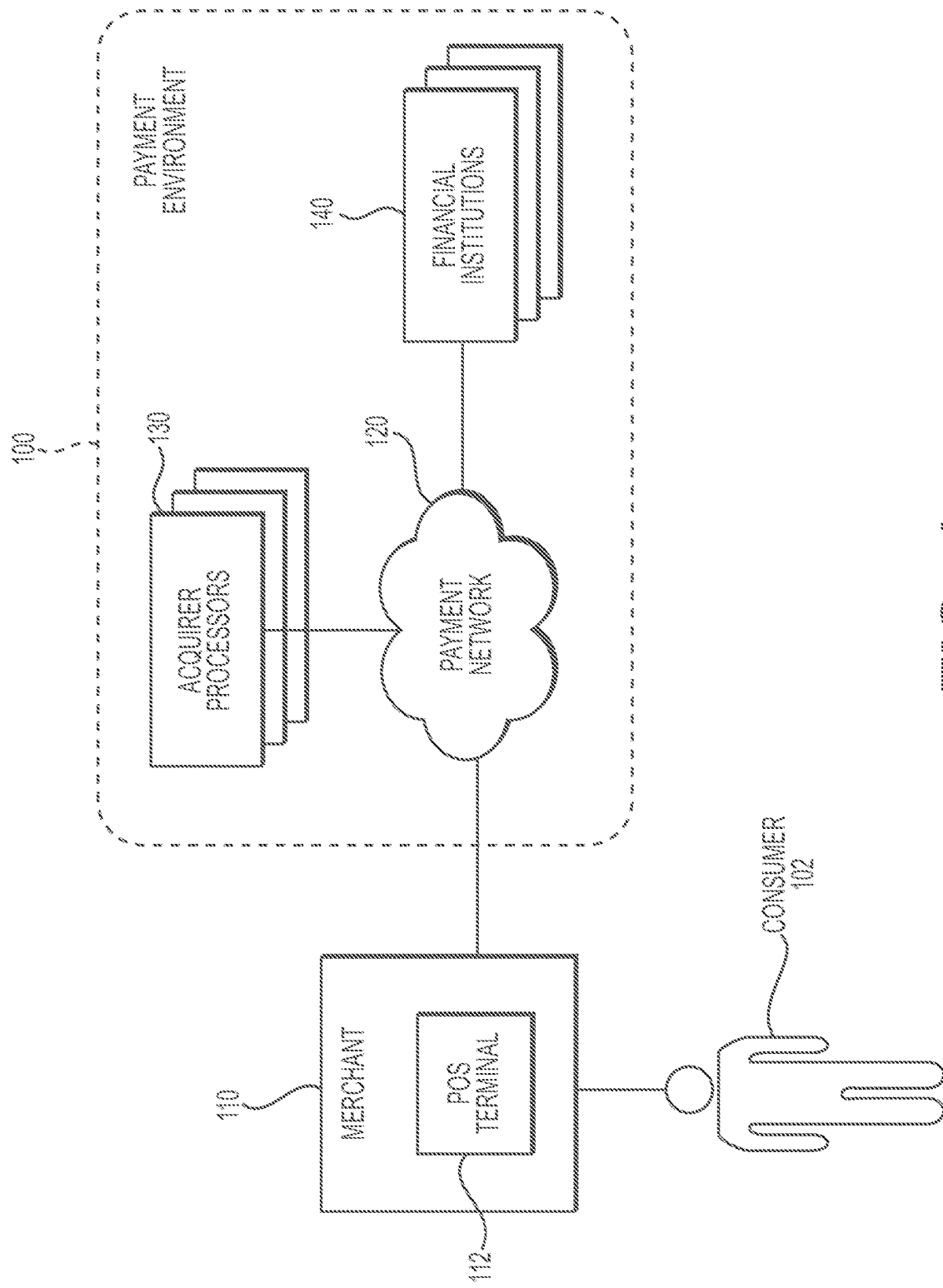
FIG. 1 depicts a block diagram of an example payment processing system, according to one or more embodiments.

While principles of the present disclosure are described herein with reference to illustrative embodiments for particular applications, it should be understood that the disclosure is not limited thereto. Those having ordinary skill in the art and access to the teachings provided herein will recognize additional modifications, applications, embodiments, and substitution of equivalents all fall within the scope of the embodiments described herein. Accordingly, the invention is not to be considered as limited by the foregoing description.

Various non-limiting embodiments of the present disclosure will now be described to provide an overall understanding of the principles of the structure, function, and use of systems and methods disclosed herein for the generating of sample code for an API for payment processing in a payment network and validating the generated sample code.

As described above, the cost of developing and certifying software to interact with an acquirer processor's payment system may be high. Thus, the embodiments of the present disclosure are directed to improving (i.e., reducing) the complexity and cost of such an implementation by providing sample code for accessing an acquirer processor's payment system according to the acquirer processor's published API. Furthermore, embodiments may provide for automatic re-generation of the sample code based on detected changes to the published API and for automated validation of the generated code.

Merchants use payment platforms, such as Point of Sale ("POS") terminals and POS systems, to accept payments from consumers in the form of cash, check, credit cards, and so forth. Although POS terminals and POS systems are the most common type of payment platforms, the term "payment platform" as used herein is intended to be construed broadly and would include systems for coupon redemption, and systems for implementing frequent use programs or customer loyalty programs, among other suitable transaction-based systems that require certification of their ability to correctly process transactions with other systems. Non-limiting examples of transaction-based systems could also include payment facilitators, ecommerce systems, mobile platforms, non-terminal POS solutions, and software solutions, such as those developed by independent software vendors, among other suitable transaction-based systems. Further, although this disclosure describes automatic generation of sample code for an API for payment processing in a payment network, the inventive principles disclosed herein are applicable to automatic sample code generation for APIs in other fields.

One or more examples of these non-limiting embodiments are illustrated in the selected examples disclosed and described in detail with reference to FIGS. 1-7 in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

Turning to FIG. 1, a consumer 102, during the checkout process with a merchant 110, pays for goods or services from merchant 110 at a POS terminal 112. Consumer 102 may use a payment card as payment and the transaction is processed through a payment environment 100. Because merchant 110 generally can use a different bank or financial institution 140 than consumer 102, an acquirer processor 130 handles the financial transactions that transfer payment between the financial institution 140 of consumer 102 and that of merchant 110. Consumer 102 submits payment information at the POS terminal 112 of merchant 110, such as by swiping his or her payment card, inserting his or her chip-based payment card, through wireless near field communication (NFC), etc., or by any other suitable means. For simplicity, a "payment card" or "payment vehicle" generally refers to any type of financial alternative to currency, such as credit cards, debit cards, smart cards, single-use cards, pre-paid cards, and the like. POS terminal 112 sends a payment request by way of a payment network 120 to an acquirer processor 130. Acquirer processor 130 requests an electronic transfer of funds from the received funds to the financial institution 140 associated with merchant 110.

Similarly, consumer 102 may purchase goods and services from online vendors, utilities, and service providers among other parties. Those parties' payment platforms may accept bank and payment card payments, as well as payments using third party payment providers, as would be understood by one of ordinary skill in the art. Example third party payment providers include, but are not limited to Apple Pay™ Android Pay™ and PayPal™ among other suitable third party payment providers. Consumers 102 also may pay for goods and services using a mobile app executing on a mobile computing device, such as an iPhone™ from Apple™ or an Android™ based smartphone.

Before acquirer processor 130 grants access to the acquirer processor's system for processing payments, a payment platform can be required to go through a certification process. The certification process may include sending one or more test transactions from a payment platform to a certification system, and analyzing the transaction using an analytics system.

The payment platform, such as POS terminal 112, may operate by executing payment platform software provided by an independent software vendor (ISV). The ISV may develop the payment platform software to interact with one or more application programming interfaces (APIs), for payment processing in a payment network, published by acquirer processor 130. The payment platform software may be developed in any suitable programming language, such as Java, Ruby, Python, C#, JavaScript, PHP, Perl, etc. An example computing environment for deploying an API for payment processing in a payment network will be discussed below with respect to FIG. 2.

Figure 2:
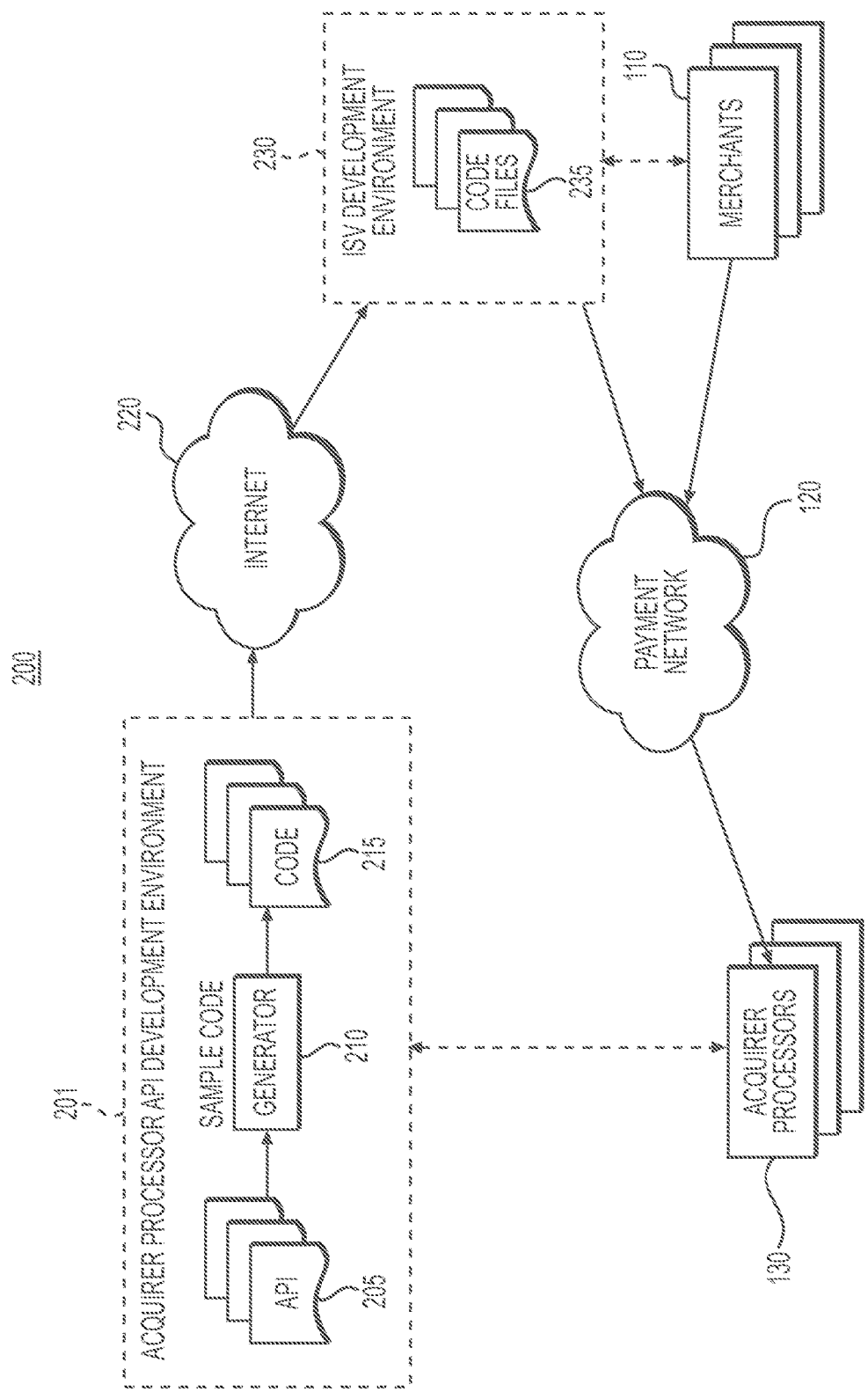
FIG. 2 depicts a block diagram of an example computing environment for deploying an application programming interface (API) for payment processing in a payment network, according to one or more embodiments.

FIG. 2 depicts an example computing environment 200 for deploying an API for payment processing in a payment network. As shown in FIG. 2, computing environment 200 may include an acquirer processor API development environment 201, which will be described in greater detail below with respect to FIG. 3, a computer network 220, such as the Internet, a payment platform ISV development environment 230, payment network 120, and acquirer processor 130. The acquirer processor API development environment 201 may include a plurality of API specification documents 205, a sample code generator 210, and a plurality of generated sample computer code files 215. The ISV payment platform development environment 230 may include a plurality of payment platform implementation files 235.

Within example computing environment 200 for deploying an API, an acquirer processor 130 may develop the plurality of API specification documents 205 to provide an interface for a payment platform developed by the ISV and implemented by a merchant 110 to interact with acquirer processor 130 by way of payment network 120. To facilitate more rapid and more accurate development of the payment platform by the ISV, acquirer processor 130 may generate a plurality of sample computer code files 215 from the plurality of API specification documents 205 using sample code generator 210. Each API specification document 205 may pertain to an interface provided for a particular acquirer processor. Sample code generator 210 may be implemented in any suitable programming language, such as, for example, Node.js.

Generated sample computer code files 215 may be specific to each API or may demonstrate a particular process flow between a payment platform and an acquirer processor. Each generated sample computer code file 215 may be generated separately in any suitable programming language, such as Java, Ruby, Python, C#, JavaScript, PHP, Perl, etc.

Following generation of sample computer code files 215, the ISV may then retrieve and store the plurality of generated sample computer code files 215 by way of the computer network 220 on the payment platform ISV development environment 230. Within payment platform ISV development environment 230, the ISV may develop a plurality of payment platform implementation files 235. Payment platform implementation files 235 may include computer code for enabling a merchant 110 to interact with acquirer processor 130 according to published API 205 and generated sample computer code files 215. Payment platform implementation files 235 may also include configuration files and files for data interchange, such as sample transaction data. Such sample transaction data may be stored in any suitable format, such as JavaScript Object Notation (JSON) format. Thus, the ISV may develop a working payment platform for interacting with acquirer processer 130 by referring to generated sample computer code files 215.

Once the ISV has developed a working payment platform, the ISV may perform testing and validation of the payment platform by interacting with acquirer processor 130 by way of payment network 120. The interaction with acquirer processor 130 by way of payment network 120 may include performing round-trip test transactions with acquirer processor 130 using the configuration files and files for data interchange, including the sample transaction data, developed as part of payment platform implementation files 235.

As discussed above, development of a payment platform for interacting with acquirer processor 130 may involve acquirer processer 130 generating the plurality of sample computer code files 215 from the plurality of API specification documents 205 using sample code generator 210. An example process flow for automatically generating sample code for payment processing in a payment network from an API will be described below with reference to FIG. 3.

Figure 3:
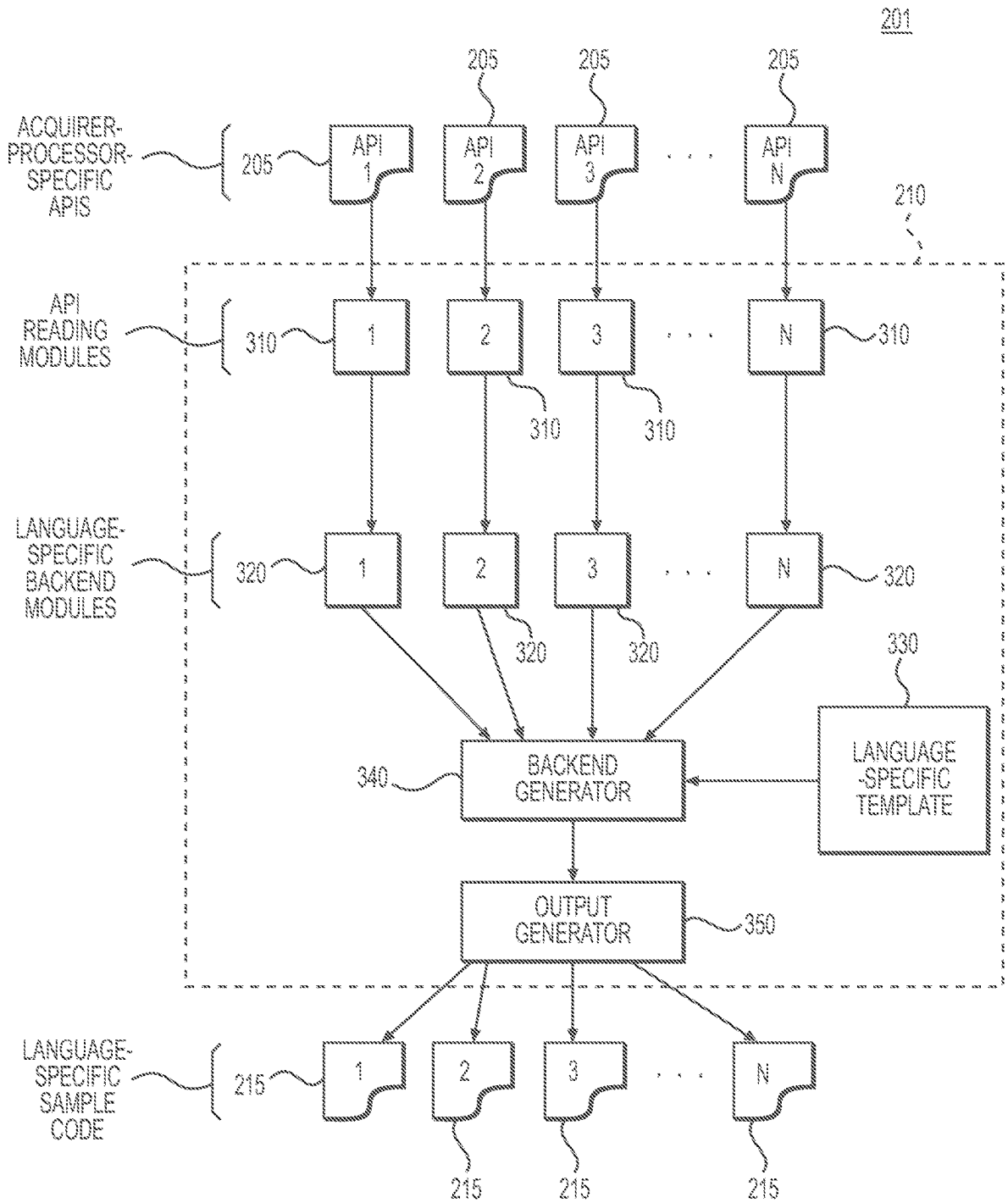
FIG. 3 depicts a block diagram of an example process flow for automatically generating sample code for payment processing in a payment network from an API, according to one or more embodiments.

FIG. 3 depicts an example process flow 201 for automatically generating sample code for payment processing in a payment network from an API. As shown in FIG. 3, process flow 201 may include a plurality of API specification documents 205, a plurality of API reading modules 310, a backend generator 340, a plurality of language-specific backend modules 320, an output generator 350, and a plurality of generated sample computer code files 215. The language-specific components, including the plurality of language-specific backend modules 320, and/or the plurality of generated sample computer code files 215 may be specific to a particular implementation language, such as Java, Ruby, Python, C#, JavaScript, PHP, Perl, etc. In addition, each of the API specification documents 205 and the plurality of API reading modules 310 may be specific to an API for interacting with a particular acquirer processor 130. However, multiple acquirer processors 130 may be supported.

In the example process flow 201 for automatically generating sample code for payment processing in a payment network depicted in FIG. 3, each API reading module 310 may read a corresponding API specification document 205 and pass acquirer processor-specific API data describing the API to a language-specific backend module 320. The language-specific backend module converts the acquirer processor-specific API data into a format that can be used by output generator 350 and passes the resulting data to backend generator 340. Backend generator 340 may then pass the data converted by the language-specific backend module and a language-specific template 330 to output generator 350, which produces generated sample computer code files 215.

Figure 4:
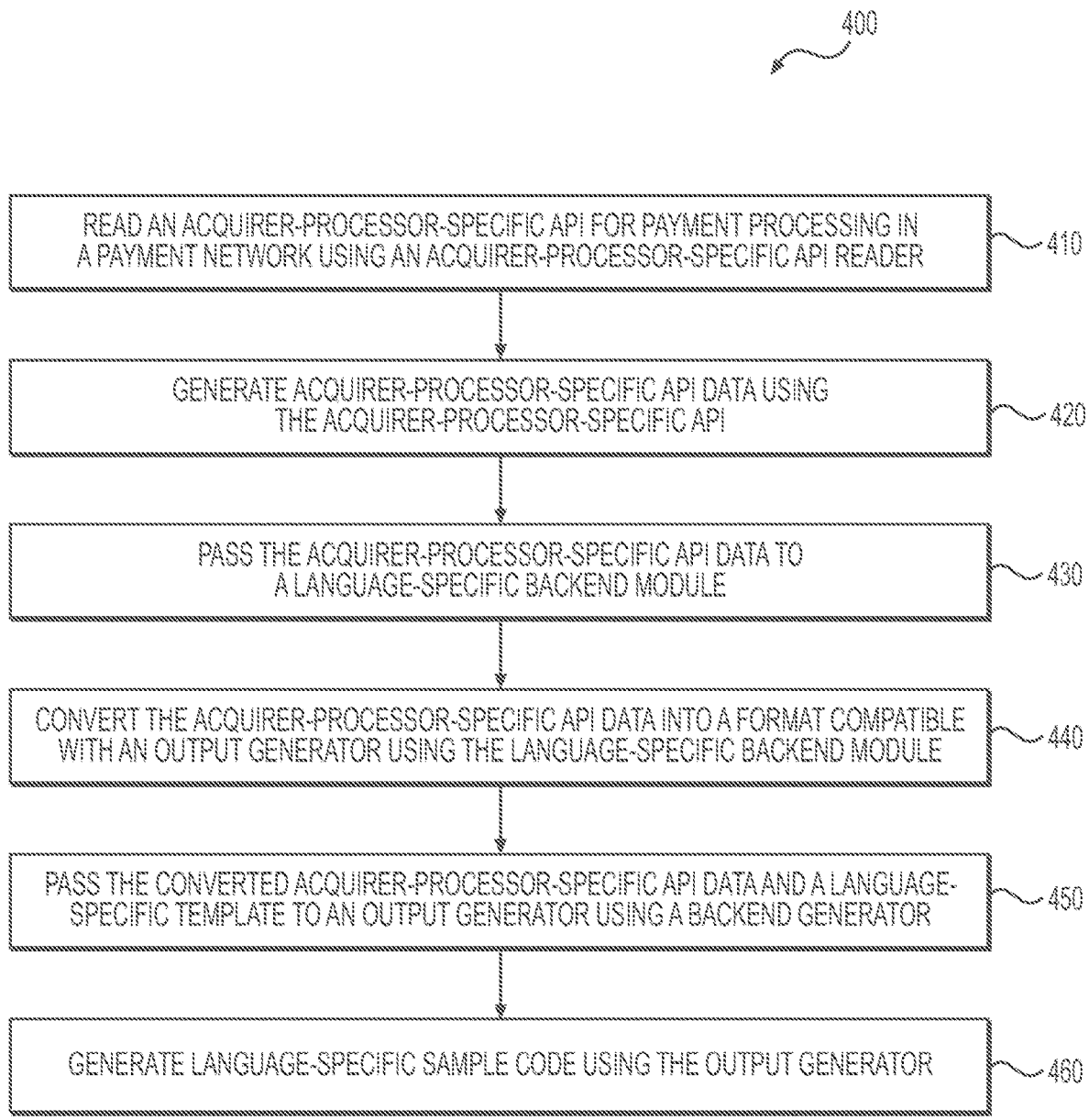
FIG. 4 is a flow chart depicting an example process for automatically generating sample code for an API for payment processing in a payment network, according to one or more embodiments.

FIG. 4 is a flow chart depicting an example method 400 for automatically generating sample code for an API for payment processing in a payment network, according to one or more embodiments.

As shown in FIG. 4, operation 410 may include reading an acquirer-processor-specific API for payment processing in a payment network using an acquirer-processor-specific API reader. For example, acquirer processor-specific API reader 310 may read an acquirer-processor-specific API 205 as depicted in FIG. 3. Operation 420 may include generating acquirer-processor-specific API data using the acquirer-processor-specific API reader. Operation 430 may include passing the acquirer-processor-specific API data to a language-specific backend module. For example, the acquirer-processor-specific API data produced by the acquirer-processor-specific API reader depicted in FIG. 3 may be passed to language-specific backend modules 320 depicted in FIG. 3. Operation 440 may include converting the acquirer processor-specific API data into a format compatible with an output generator using the language-specific backend module. For example, language-specific backend module 320 depicted in FIG. 3 may convert the acquirer processor-specific API data produced by the API reading modules 310 depicted in FIG. 3. Operation 450 may include passing the converted acquirer processor-specific API data and a language-specific template to an output generator using a backend generator. For example, backend generator 340 may pass the converted acquirer processor-specific API data produced by language-specific backend module 320 and language-specific template 330 to an output generator, such as the output generator 350 depicted in FIG. 3. Operation 460 may include generating language-specific sample code using the output generator. For example, output generator 350 may generate language-specific sample code 215.

Figure 5:
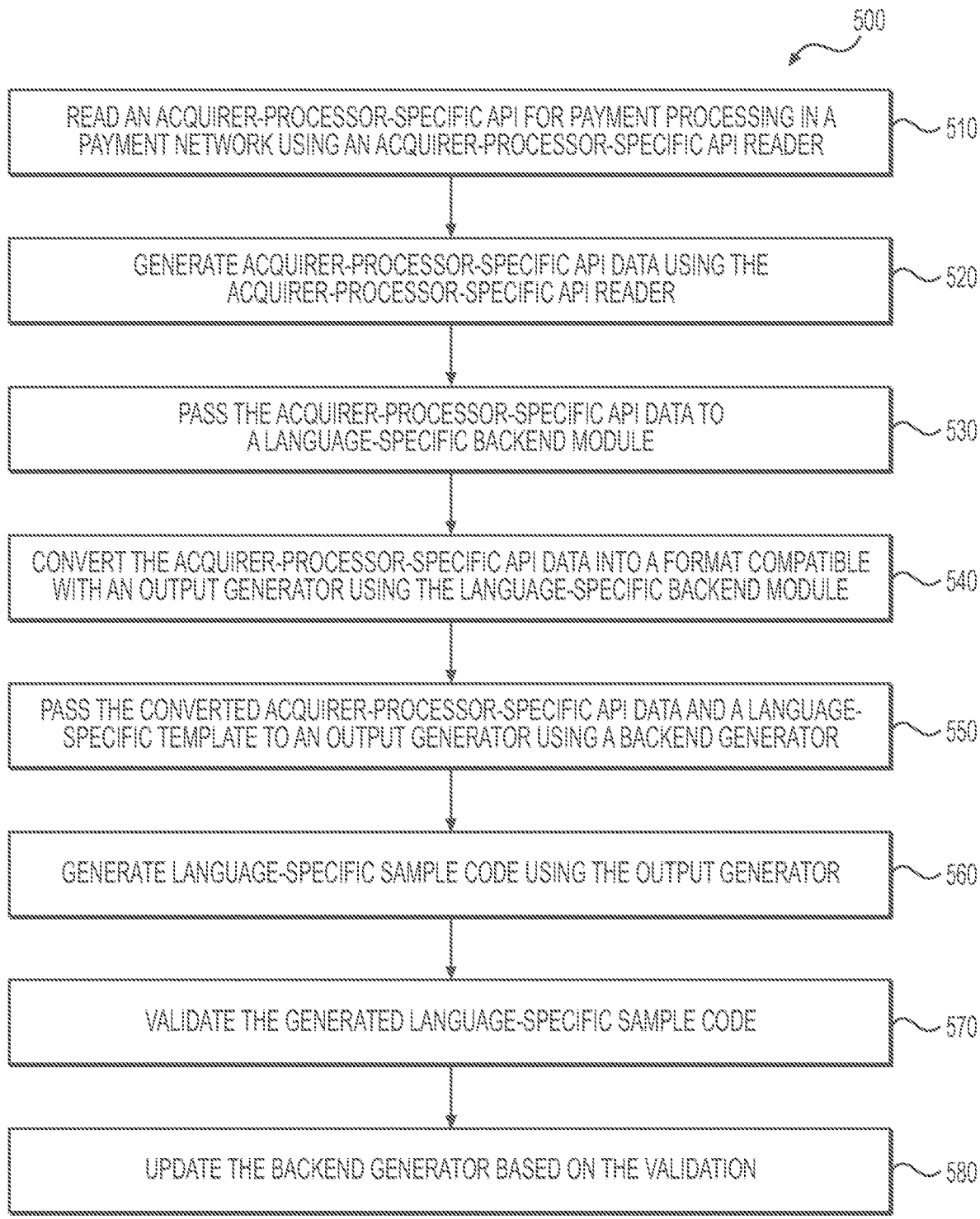
FIG. 5 is a flow chart depicting an additional example process for automatically generating sample code for an API for payment processing in a payment network, according to one or more embodiments.

FIG. 5 is a flow chart depicting an additional example method 600 for automatically generating sample code for an API for payment processing in a payment network, according to one or more embodiments.

As shown in FIG. 5, operation 510 may include reading an acquirer-processor-specific API for payment processing in a payment network using an acquirer-processor-specific API reader. For example, acquirer processor-specific API reader 310 may read an acquirer-processor-specific API 205 as depicted in FIG. 3. Operation 520 may include generating acquirer-processor-specific API data using the acquirer-processor-specific API reader. Operation 530 may include passing the acquirer-processor-specific API data to a language-specific backend module. For example, the acquirer-processor-specific API data produced by the acquirer-processor-specific API reader depicted in FIG. 3 may be passed to language-specific backend modules 320 depicted in FIG. 3. Operation 540 may include converting the acquirer processor-specific API data into a format compatible with an output generator using the language-specific backend module. For example, language-specific backend module 320 depicted in FIG. 3 may convert the acquirer processor-specific API data produced by the API reading modules 310 depicted in FIG. 3. Operation 550 may include passing the converted acquirer processor-specific API data and a language-specific template to an output generator using a backend generator. For example, backend generator 340 may pass the converted acquirer processor-specific API data produced by language-specific backend module 320 and language-specific template 330 to an output generator, such as the output generator 350 depicted in FIG. 3. Operation 560 may include generating language-specific sample code using the output generator. For example, output generator 350 may generate language-specific sample code 215. Operation 570 may include validating the generated language-specific sample code. For example, generated language-specific sample code 215 may be validated by interacting with acquirer processor 130 by way of payment network 120. Operation 580 may include updating the backend generator based on the validation. For example, backend generator 340 may be updated based on the validation.

Figure 6:
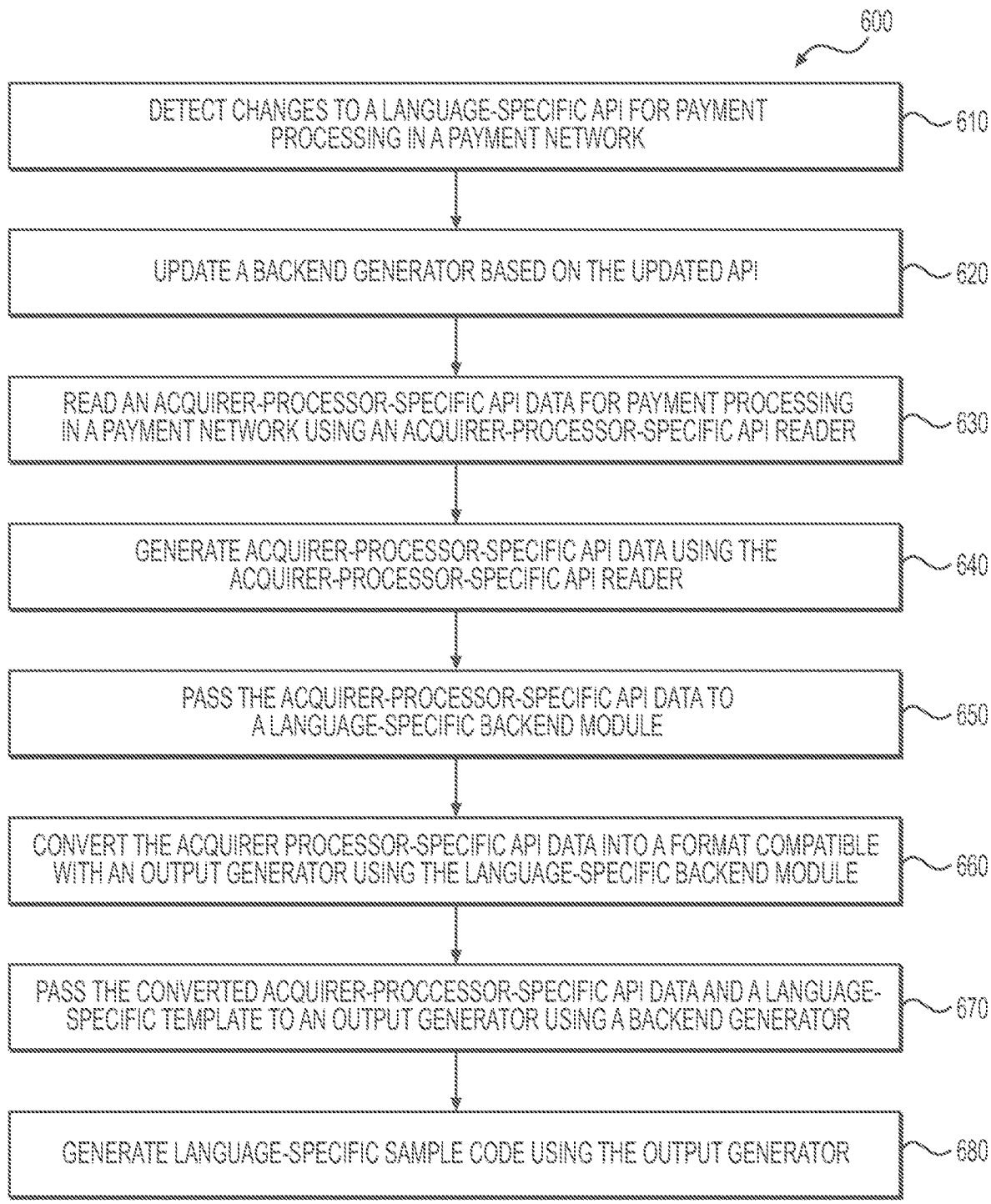
FIG. 6 is a flow chart depicting an example process for automatically generating sample code for an API for payment processing in a payment network and validating the generated sample code, according to one or more embodiments.

FIG. 6 is a flow chart depicting an example method 700 for automatically generating sample code for an API for payment processing in a payment network and validating the generated sample code, according to one or more embodiments.

As shown in FIG. 6, operation 610 may include detecting changes to a language-specific API for payment processing in a payment network. For example, detecting changes to acquirer processor-specific API 205 for payment processing in a payment network. Operation 620 may include updating a backend generator based on the updated API. For example, backend generator 340 depicted in FIGS. 2 and 3, may be updated based on the updated acquirer processor-specific API 205. Operation 630 may include reading an acquirer-processor-specific API for payment processing in a payment network using an acquirer-processor-specific API reader. For example, acquirer processor-specific API reader 310 may read an acquirer-processor-specific API 205 as depicted in FIG. 3. Operation 640 may include generating acquirer-processor-specific API data using the acquirer-processor-specific API reader. Operation 650 may include passing the acquirer-processor-specific API data to a language-specific backend module. For example, the acquirer-processor-specific API data produced by the acquirer-processor-specific API reader depicted in FIG. 3 may be passed to language-specific backend modules 320 depicted in FIG. 3. Operation 660 may include converting the acquirer processor-specific API data into a format compatible with an output generator using the language-specific backend module. For example, language-specific backend module 320 depicted in FIG. 3 may convert the acquirer processor-specific API data produced by the API reading modules 310 depicted in FIG. 3. Operation 670 may include passing the converted acquirer processor-specific API data and a language-specific template to an output generator using a backend generator. For example, backend generator 340 may pass the converted acquirer processor-specific API data produced by language-specific backend module 320 and language-specific template 330 to an output generator, such as the output generator 350 depicted in FIG. 3. Operation 680 may include generating language-specific sample code using the output generator. For example, output generator 350 may generate language-specific sample code 215.

The operations of detecting changes to acquirer processor-specific API 205 (step 610) and updating backend generator 340 (step 620) may be performed within a continuous integration tool. With such a continuous integration tool, an updating of the backend generator and regeneration of the language-specific sample code may be started, for example, by a commit of acquirer processor-specific API 205 in a version control system, by a scheduling mechanism such as cron, when updating or generation of other related files have completed, or by requesting a specific updating or generation URL, etc.

Although the API specification documents 205 may be written in a particular API documentation language, such as Swagger or Web Services Description Language (WSDL), existing systems and methods for producing generated code from API documents using such API documentation languages are directed to production of software development kits (SDKs) based on the documented API. In contrast, the systems and methods disclosed herein for automatically generating sample code for an API allows for greater control over the generated output and may produce fully operational but customizable sample code demonstrating workflows.

Example workflows for which sample code may be generated may include cardholder authentication, transaction submission, fraud detection, transaction reversal, etc. However, any workflow supported by the API specification documents 205 may be represented in the generated sample code.

For example, consider an ISV seeking to develop software to interface with an acquirer processor API. If the software development process is conducted entirely by hand based on the acquirer processor's published API then the process may be time consuming, expensive and error-prone. In contrast, if the software development process is conducted based on generated sample code, then the ISV developer will have tested and documented working sample code available to help streamline the development process. This may allow the ISV developer to build on a working example to develop a custom implementation for their customer. This may reduce costs and improve accuracy of the implementation, which may, in turn, increase the likelihood of certification for the implementation. Moreover, because the sample code may be generated automatically upon a change to the acquirer processor API, the ISV can be assured that the implementation is based on the most current API.

These and other embodiments of the systems and methods may be used as would be recognized by those skilled in the art. The above descriptions of various systems and methods are intended to illustrate specific examples and describe certain ways of making and using the systems disclosed and described here. These descriptions are neither intended to be nor should be taken as an exhaustive list of the possible ways in which these systems can be made and used. A number of modifications, including substitutions of systems between or among examples and variations among combinations can be made. Those modifications and variations should be apparent to those of ordinary skill in this area after having read this disclosure.

The systems, apparatuses, devices, and methods disclosed herein are described in detail by way of examples and with reference to the figures. The examples discussed herein are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context. It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems such as client-server distributed systems, and can use other protocols, or operate at other layers in communication protocol stacks, than are described.

It is intended that the specification and examples be considered as exemplary only, with a true scope and spirit of the invention being indicated by the following claims.

What is claimed is:

1. A method of automatically generating sample code for an application programming interface (API) for electronic transactions processing in an electronic transactions network, the method comprising:

passing, by at least one processor, converted processor-specific API data and a language-specific template corresponding to the converted processor-specific API data to an output generator using a backend generator; and generating, by the at least one processor, language-specific sample code by the output generator using the converted processor-specific API data and the language-specific template corresponding to the converted processor-specific API data.

2. The method of claim 1, wherein the method is performed within a continuous integration system.

3. The method of claim 1, wherein the validating includes performing, by the at least one processor, round-trip test transactions with an acquirer processor using configuration files and sample transaction data.

4. The method of claim 1, further comprising:

reading, by the at least one processor, a processor-specific API, using a processor-specific API reader;

generating, by the at least one processor, the converted processor-specific API data using the processor-specific API reader;

passing, by the at least one processor, the converted processor-specific API data to a language-specific backend module; and generating the converted processor-specific API data by converting, by the at least one processor using the language-specific backend module, the converted processor-specific API data into a format compatible with the output generator, wherein the generating the language-specific sample code by the output generator using the converted processor-specific API data and the language-specific template corresponding to the converted processor-specific API data is performed based on passing the converted processor-specific API data and the language-specific template corresponding to the converted processor-specific API data to the output generator using the backend generator.

5. The method of claim 4, further comprising:

detecting, by the at least one processor, a change in the converted processor-specific API data; and updating, by the at least one processor, the backend generator according to the detected change in the converted processor-specific API data, wherein the reading the processor-specific API, using the processor-specific API reader, is performed based on updating the backend generator.

6. The method of claim 1, further comprising:

validating, by the at least one processor, the generated language-specific sample code; and updating, by the at least one processor, the backend generator according to a result of the validation.

7. A computer system for automatically generating sample code for an application programming interface (API) for electronic transactions processing in an electronic transactions network, the computer system comprising:

a memory; and at least one processor configured to perform operations comprising:

passing converted processor-specific API data and a language-specific template corresponding to the converted processor-specific API data to an output generator using a backend generator; and generating language-specific sample code by the output generator using the converted processor-specific API data and the language-specific template corresponding to the converted processor-specific API data.

8. The computer system of claim 7, wherein the operations are performed within a continuous integration system.

9. The computer system of claim 7, wherein the validating includes performing round-trip test transactions with an acquirer processor using configuration files and sample transaction data.

10. The computer system of claim 7, wherein the operations further comprise:

reading a processor-specific API, using a processor-specific API reader;

generating the converted processor-specific API data using the processor-specific API reader;

passing the converted processor-specific API data to a language-specific backend module; and generating the converted processor-specific API data by converting, using the language-specific backend module, the converted processor-specific API data into a format compatible with the output generator, wherein the generating the language-specific sample code by the output generator using the converted processor-specific API data and the language-specific template corresponding to the converted processor-specific API data is performed based on passing the converted processor-specific API data and the language-specific template corresponding to the converted processor-specific API data to the output generator using the backend generator.

11. The computer system of claim 10, wherein the operations further comprise:

detecting a change in the converted processor-specific API data; and updating the backend generator according to the detected change in the converted processor-specific API data, wherein the reading the processor-specific API, using the processor-specific API reader, is performed based on updating the backend generator.

12. The computer system of claim 7, wherein the operations further comprise:

validating the generated language-specific sample code; and updating the backend generator according to a result of the validation.

13. A non-transitory computer readable medium storing a program causing a computer to execute a method of automatically generating sample code for an application programming interface (API) for electronic transactions processing in an electronic transactions network, the method comprising:

passing converted processor-specific API data and a language-specific template corresponding to the converted processor-specific API data to an output generator using a backend generator; and generating language-specific sample code by the output generator using the converted processor-specific API data and the language-specific template corresponding to the converted processor-specific API data.

14. The non-transitory computer readable medium of claim 13, wherein the method is performed within a continuous integration system.

15. The non-transitory computer readable medium of claim 13, wherein the validating includes performing round-trip test transactions with an acquirer processor using configuration files and sample transaction data.

16. The non-transitory computer readable medium of claim 13, wherein the method further comprises:
   reading a processor-specific API, using a processor-specific API reader;
   generating the converted processor-specific API data using the processor-specific API reader;
   passing the converted processor-specific API data to a language-specific backend module; and
   generating the converted processor-specific API data by converting, using the language-specific backend module, the converted processor-specific API data into a format compatible with the output generator,
   wherein the generating the language-specific sample code by the output generator using the converted processor-specific API data and the language-specific template corresponding to the converted processor-specific API data is performed based on passing the converted processor-specific API data and the language-specific template corresponding to the converted processor-specific API data to the output generator using the backend generator.

17. The non-transitory computer readable medium of claim 16, wherein the method further comprises:
   detecting a change in the converted processor-specific API data; and
   updating the backend generator according to the detected change in the converted processor-specific API data,
   wherein the reading the processor-specific API, using the processor-specific API reader, is performed based on updating the backend generator.

18. The non-transitory computer readable medium of claim 13, wherein the method further comprises:
   validating the generated language-specific sample code; and
   updating the backend generator according to a result of the validation.

* * * * *